Jan. 13, 1925.
P. M. WHITNEY
1,523,325
AUTOMOBILE HEADLIGHT DIMMING SWITCH
Filed Aug. 6, 1921
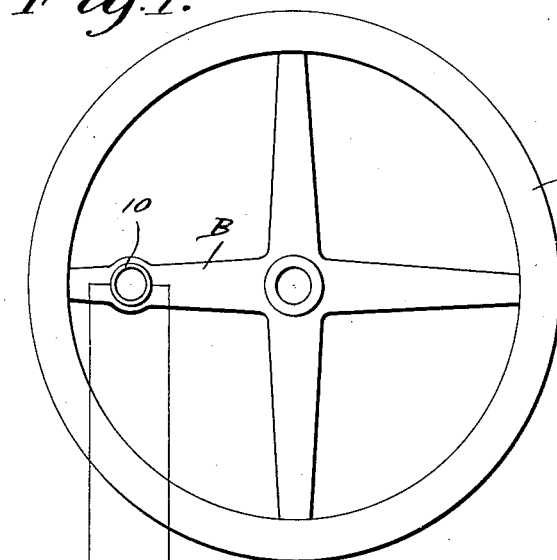
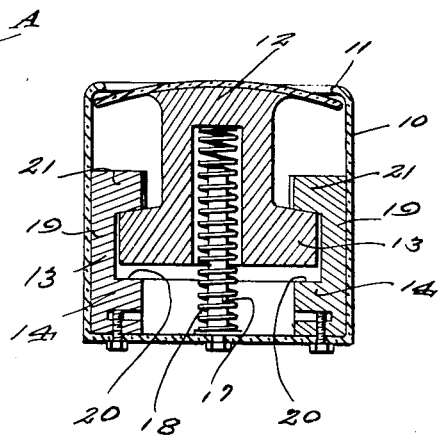
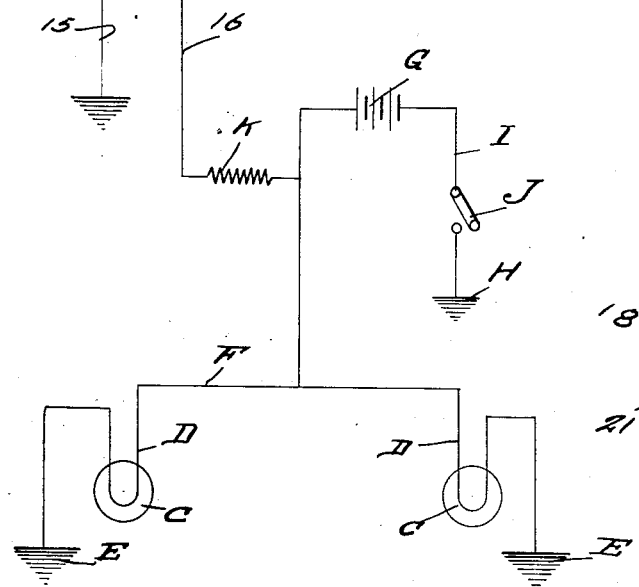
P. M. Whitney INVENTOR
BY *Victor J. Evans*
ATTORNEY Patented Jan. 13, 1925.

1,523,325

UNITED STATES PATENT OFFICE.

PHILIP M. WHITNEY, OF NORTHFIELD, VERMONT.

AUTOMOBILE HEADLIGHT DIMMING SWITCH.

Application filed August 6, 1921. Serial No. 490,235.

*To all whom it may concern:*

Be it known that I, PHILIP M. WHITNEY, a citizen of the United States, residing at Northfield, in the county of Washington and State of Vermont, have invented new and useful Improvements in Automobile Headlight-Dimming Switches, of which the following is a specification.

This invention relates to electric switches, particularly to switches designed for use in connection with automobiles, and has for its object the provision of a switch device adapted for association with the spokes of the steering wheel of an automobile and connected in circuit with the head-lights and the dimming or resistance coil usually provided on automobiles, my switch device being in the nature of a push-button which may be operated for dimming the head lights of the vehicle, a simple push or pressure upon the switch resulting in temporary dimming of the light and a push followed by partial rotation of the button member resulting in locking the switch device so that the head lights will be dimmed as long as desired.

An important object of this invention is the rotation of the dimming switch which is disposed either within a recess formed in one of the spokes of the steering wheel on the spoke nearest the left hand of the driver when the steering wheel is in its normal position with the vehicle travelling straight ahead, or the switch may be clamped upon such a spoke if the construction of the wheel is such as to preclude the disposition of the switch within a recess in the spoke.

Another object is the provision of a head light control switch of this character which will have the great advantage of leaving the operator's right hand free for shifting the gears or performing other functions necessary to the proper control of the vehicle while at the same time the control switch may be very effectually operated owing to its location near the thumb of the left hand of the operator.

Still another object is the provision of a switch device of this character which is formed really as a push button and which is spring pressed into normal or inoperative position so that the head lights will be normally bright, the push button element of the device being capable of rotation subsequent to the application of pressure upon it so that it may be locked beneath a retaining element so as to hold the switch device in such position that the headlights will be maintained in their dimmed condition until their use as bright headlights is desired.

An additional object is the provision of a device of this character which will be very simple and inexpensive in manufacture, highly efficient in use, easy in installation, positive in action, durable in service and a general improvement in the art.

With the above and other objects and advantages in view, the invention consists in the details of construction to be hereinafter more fully described and claimed and illustrated in the accompanying drawings in which:

Figure 1 is a plan view of a portion of a steering wheel showing my control push button switch associated therewith and showing the diagram of the electric circuit, including the switch, the usual resistance coil and the headlights.

Figure 2 is an enlarged longitudinal section view through my switch device, and

Figure 3 is a cross sectional view, therethrough.

Referring more particularly to the drawings, the letter A designates a portion of the rim of the steering wheel of an automobile and B designates one of the spokes of the steering wheel, preferably the spoke nearest the left thumb of the operator when the vehicle is travelling straight ahead. The letter C designates the head lights of the automobile which are connected by a wire D and which have their other terminals grounded at E. The wire D is connected by a wire F with one terminal of a source of current G which has its other terminal connected with its ground H by a wire I within which is interposed a suitable switch J. The letter K designates a resistance coil which is connected with the wire F and with my device to be described.

In carrying out my invention I provide a switch device associated with the steering wheel and comprising an outer containing member 10 of insulating material such as fiberoid preferably recessed into the spoke B of the wheel as indicated in the drawings, though it is of course conceivable that this containing member might be clamped or otherwise secured upon the spoke if found necessary. At its upper end this member 10, which incidentally is clyindrical in shape is formed with an inwardly extending flange 11 serving as a stop for limiting the outward movement of an axially movable push button member 12 which is entirely metallic or which has at least its base portion formed of metal and which is slidable within the cylindrical containing member 10. At its lower end the push button member 12 is formed with laterally extending arms 13 which are engageable with metallic contact members 14 secured within the bottom of the containing member 10 and spaced from each other. Connected with the respective contacts 14 are wires 15 and 16, the former of which is grounded and the latter of which leads to the resistance coil. Carried by the movable push button member 12 is a central guide rod 17 which is surrounded by a coil spring 18 which is for the purpose of holding the push button member 12 normally in its outermost or uppermost position in engagement with the inturned flange 11 as clearly shown in the drawings. The members 14 are formed with upward extensions which are cut away at the intermediate portions of their confronting faces to define lower shoulders 20 and upper projections 21.

In the operation of the device it will be seen that under ordinary conditions the push button member 12 will be in its outermost or uppermost position in engagement with the flange 11 owing to the resistance of the spring 18. When the push button structure is in this position it will be quite evident that the headlights C of the automobile will be burning brightly owing to the fact that there is absolutely no resistance interposed in the circuit. In case the operator desires to dim the headlights, as for instance upon approaching another vehicle, it is merely necessary that he place his left thumb upon the push button member 12 and depress the same in opposition to the resistance of the spring 18 whereupon the arms 13 at the lower end of the push button will be brought into engagement with the shoulders of the contacts 14 and this will of course result in throwing the resistance coil K in circuit with the source of current and with the headlights. Ordinarily the position of the push button is such that the arms 13 pass between the projections 21. In case it is desired to maintain the lamps in their dimmed condition for any appreciable length of time, it is merely necessary that the operator depress the push button member 12 as above described and then rotate the same through substantially ninety degrees whereby to bring the arms 13 of the push button member beneath the projections 21 on the extensions 19 of the contacts so that when pressure on the button is subsequently released, the arms 13 will engage the projections 21. It should be stated that the elements 18 and 21 are preferably formed integrally with the segments 14 though they may be electrically connected therewith so that regardless of whether the push button member is depressed to bring the arms 13 thereof into engagement with the shoulders 20 or whether the push button member is depressed and then subsequently rotated to bring the arms 13 thereof into engagement beneath the projections 21, the circuit will be closed through the resistance coil K.

From the foregoing description and a study of the drawings, it will be readily apparent that I have thus provided an extremely simple and inexpensive switch device adapted for association with the steering wheel of an automobile whereby the driver or operator of the automobile may very quickly and easily dim his head-lights in accordance with the regulations which are in effect in certain jurisdictions or in accordance with the common courtesy of the road so that an approaching vehicle may pass in safety without any danger of blinding or dazzling of the operator thereof. It will be observed that owing to the fact that my device is either recessed into or suitably clamped or otherwise secured upon a spoke of the steering wheel in such a position that the push button member may be engaged by the thumb of the left hand of the operator, the right hand of the operator is entirely free for shifting gears, operating the emergency brake or performing any other functions necessary in the driving of the car.

While I have shown and described the preferred embodiment of the invention it is of course to be readily understood that I reserve the right to make such changes in the form, construction and arrangement of parts as will not depart from the spirit of the invention or the scope of the subjoined claim.

Having thus described my invention what I claim is:

A switch of the character described comprising a cylindrical casing of insulating material, provided at its upper end with an inturned retaining flange, a pair of contacts located within said casing and each including a half ring portion having an upward projection thereon terminating in a lateral flange, said upright portions being arranged diametrically opposite with said lateral flanges extending toward each other, and a spring pressed metallic member of a plunger like nature extending axially of the casing and having its upper end formed with a head engaging said retaining flange and having its lower end formed with oppositely extending wings adapted to engage and bridge said half ring members when the metallic member is depressed and adapted to engage beneath the lateral flanges on the uprights when the metallic member is partially rotated and subsequently released.

In testimony whereof I affix my signature.

PHILIP M. WHITNEY.